United States Patent [19]

Kitaj

[11] 3,801,361
[45] Apr. 2, 1974

[54] COATED GLASS SURFACE
[75] Inventor: Walter Kitaj, Toledo, Ohio
[73] Assignee: Owens-Illinois, Inc., Toledo, Ohio
[22] Filed: Sept. 17, 1971
[21] Appl. No.: 181,615

[52] U.S. Cl.............. 117/124 E, 117/54, 117/18, 117/124 F, 117/161 UF, 117/161.2 A
[51] Int. Cl. .................... B03c 17/30, B03c 17/32
[58] Field of Search........... 117/54, 123 D, 161.2 A, 117/161 UF, 118, 124 E, 124 F, 126 GS, 126 GN, 94; 260/29.6 A, 448.2 B, 448.2 R

[56] References Cited
UNITED STATES PATENTS

| 2,872,471 | 2/1959 | Ramsden...................... 260/448.2 R |
| 3,438,801 | 4/1969 | Schlientz et al................ 117/124 F |
| 3,433,764 | 9/1972 | Walmsley..................... 117/124 F |
| 3,075,948 | 1/1963 | Santelli............................ 117/124 E |
| 3,644,141 | 2/1972 | Preston..................... 260/29.6 A X |
| 3,350,337 | 10/1967 | Campbell.................. 260/29.6 A X |

Primary Examiner—William D. Martin
Assistant Examiner—Janyce A. Bell
Attorney, Agent, or Firm—Henry P. Stevens; Edward J. Holler

[57] ABSTRACT

A glass surface is provided with a scratch-resistant, lubricous, substantially transparent and colorless coating by applying to the hot glass surface an aqueous composition comprising polyethylene and a silane having, attached to the silicon atom, three hydrolyzable radicals of the class consisting of methoxy, ethoxy and chloro, and one alkyl or acyl radical having from 12 to 18 carbon atoms.

2 Claims, No Drawings

COATED GLASS SURFACE

BACKGROUND OF THE INVENTION

This invention relates to the treatment of glass surfaces to impart scratch-resistance and lubricity.

Glass derives its strength from an unblemished surface, and any scratches or flaws which are present on its surface decrease its strength to as little as one-fourth of the original value. Glass articles such as jars, bottles and tumblers possess their maximum strength shortly after they are formed. Their strength rapidly diminishes when they are subjected to abrasive contact in the course of handling, filling, packaging and shipping.

This problem is particularly acute when glass containers are used by processors of foods and beverages, because the glass containers are subjected to a number of processing operations wherein they are successively washed, filled, closed and packaged for delivery. In spite of precautions taken to minimize scratching and abusive handling, the many washing, sterilizing and other operations to which such containers are subjected cause the glass to be rubbed or otherwise contacted in various ways which can cause scratching. The glass containers repeatedly come into contact with each other as they move from station to station and as they are handled in the various operations. Breakage of the glass containers can cause a substantial increase in production costs, particularly if the breakage occurs after the containers have been filled.

In order to minimize scratching and abrading of the surfaces of glass containers, which causes loss of strength and resulting breakage, glass containers have been provided with external coatings which impart scratch resistance.

One type of scratch-resistant coating which is commonly used on the exterior of glass containers is a thin, substantially colorless coating consisting of a layer of tin or titanium oxide bonded to the glass surface and covered by an organic layer consisting primarily of polyethylene. In order to be of commercial value, such a coating must not be substantially affected by the various washing cycles, such as dilute caustic wash, to which glass containers are subjected prior to filling, and must impart high lubricity and scratch resistance when the glass surface is wet as well as when it is dry.

In this type of coating both the underlying layer of tin or titanium oxide and the overlying layer of polyethylene are essential in order to provide adequate scratch resistance. The scratch resistance provided by the dual coating is much greater than the sum of the scratch resistance which is provided by a coating of tin or titanium oxide alone plus the scratch resistance which is provided by a coating of polyethylene alone.

In order to produce this dual type of coating, a layer of tin or titanium oxide is first formed on the glass surface by applying a pyrolyzable compound of tin or titanium to the glass surface while it is at a temperature above that at which the compound pyrolyzes. This operation is customarily performed shortly after a glass article leaves the glass-forming machine. The overlying coating of polyethylene is then applied after the article has cooled to a somewhat lower temperature.

In practice, the coating of polyethylene is provided on top of the coating of tin or titanium oxide by spraying a dilute aqueous suspension of polyethylene, and it is usually necessary to incorporate in the aqueous emulsion a water-soluble lubricant such as potassium oleate, to serve as an emulsifier for the polyethylene and to provide optimum scratch resistance and lubricity in the final product.

SUMMARY OF THE INVENTION

The principal object of the invention is to provide a glass surface with a scratch-resistant, lubricous, substantially transparent and colorless coating which can be applied by means of a single application of an aqueous coating composition.

A further object of the invention is to provide a glass surface with a coating affording excellent scratch-resistance and lubricity by the application of an aqueous emulsion of polyethylene without the use of an added lubricant, as well as without the preliminary application of a coating of tin or titanium oxide to the glass surface.

In commercial practice heretofore, the application of a coating of polyethylene to a glass surface has not been found to provide adequate scratch resistance unless the application of such a coating is preceded by the formation of a layer of tin or titanium oxide upon the glass surface.

In accordance with the invention, it has been discovered that a substantially transparent and colorless film having excellent scratch resistance and lubricity can be provided on a glass surface by applying to the hot glass an aqueous composition comprising polyethylene and a silane having, attached to the silicon atom, three hydrolyzable radicals of the class consisting of methoxy, ethoxy and chloro, and one alkyl or acyl radical having from 12 to 18 carbon atoms.

One feature of this invention is a preferred method in which such an aqueous composition is applied by spraying on the glass surface while the glass is at a temperature of 300° to 600°F. Preferably the silane in the aqueous composition is partially hydrolyzed before the composition is applied.

An article of manufacture embodying the invention comprises a glass surface having a scratch-resistant, lubricous, substantially transparent and colorless film which is bonded to the glass and comprises polyethylene and a condensation product of a silanol having attached to the silicon atom three hydroxy groups and one alkyl or acyl radical having from 12 to 18 carbon atoms.

When the aqueous coating composition is applied to the hot glass surface in the practice of the invention, the silane hydrolyzes substantially completely to a silanol which then partially condenses and is bonded to the glass surface. The hydrolysis of the silane and the condensation of the resulting silanol are accelerated by the relatively high temperature to which the composition is heated as it contacts the hot glass surface.

DESCRIPTION OF THE PREFERRED EMBODIMENTS

The present method of coating may be carried out conveniently at a point at which the glass articles leave an annealing lehr, using any convenient application device such as a traversing spray nozzle. At the time of application of the aqueous coating composition, the glass articles may have a temperature of about 300°F to about 600°F. The best results are obtained if the glass articles are at a temperature of about 400°F when sprayed with the aqueous coating composition and then are allowed to cool rapidly to room temperature.

The rate at which the aqueous coating composition is applied depends upon the temperature of the articles and the concentration of the composition, and can be determined by simple tests to select a suitable rate. The rate for example may be between 0.5 and 5 quarts per 100 square feet of the lehr belt, but usually is about 1 quart per 100 square feet.

The aqueous composition which is applied to the hot glass surface comprises polyethylene and a silane having, attached to the silicon atom, three hydrolyzable radicals of the class consisting of methoxy, ethoxy and chloro, and one alkyl or acyl radical having from 12 to 18 carbon atoms. Typical examples of such a silane include octadecyltrichlorosilane and dodecyltriethoxysilane. The preferred silane is stearyltrimethoxysilane.

Various polyethylene compositions which are available in the form of aqueous emulsions may be used in the practice of the invention. The molecular weight of the polyethylene in such a composition is usually from about 2,000 to about 3,000. If the glass articles to be coated will be subjected to an alkali wash during use, the aqueous polyethylene emulsion used in the practice of the invention preferably has a relatively low acid number, of the order of 15 to 20, in order that the coating may be resistant to alkali.

The proportion of the polyethylene in the aqueous composition which is applied to the hot glass may be from about 0.5 percent to about 2 percent. The scratch resistance imparted by the coating reaches a maximum when the concentration of polyethylene in the aqueous coating composition is approximately 1 percent.

The concentration of the silane in the aqueous composition which is applied to the hot glass may be between 0.1 and 5.0 percent. Preferably the silane is partially hydrolyzed in the aqueous composition before the composition is applied to the hot glass. Substantially all of the methoxy, ethoxy or chloro groups are removed by hydrolysis when the composition is applied to the hot glass, to produce a silanol which then becomes partly condensed and bonded to the glass.

The degree to which the silane is hydrolyzed before application of the aqueous composition to the hot glass may be controlled at will by controlling the temperature and the pH of the composition as well as the length of time between the initial mixing of the aqueous composition and the application of the composition to the hot glass.

The following examples are merely illustrative of the present invention and should not be considered to limit its scope in any way.

EXAMPLE 1

Stearyltrimethoxysilane (1 gram of a 50 percent alcohol solution) was dissolved in 50 cc of water. After the addition of two drops of concentrated hydrochloric acid, the solution was heated to 50°C for 10 minutes. The pH of the solution, which was about 2, was then brought to about 5 by the addition of one drop of concentrated ammonium hydroxide solution. The solution was then allowed to cool and was mixed with 1.5 grams of a 25 percent aqueous emulsion of polyethylene (AC 680) having an acid number of 16. The aqueous composition thus prepared was then used to coat several bottles by means of a spray gun supplied with compressed air at 40 lbs. per square inch gauge pressure.

Each bottle was heated to a temperature of 400°F and then placed on a rotating disc and sprayed in 10 vertical passes while the bottle was rotating.

In order to determine the scratch resistance imparted to the bottles, several bottles were subjected to the scratch test described in U.S. Pat. No. 3,323,889. This scratch test is designed to abrade the surface of one glass bottle against the surface of a similar glass bottle. One of two bottles is fastened securely in a horizontal position in a stationary set of chucks, while a second bottle is fastened in a loading device which permits the second bottle to be moved in a straight line while the second bottle is resting upon the first bottle and while a measured amount of force is transmitted vertically from the second bottle to the first bottle. During the test the axes of the bottles are maintained at an angle of 90° to one another, and the upper bottle is moved at a constant speed of 2.8 inches per minute in a direction at an angle of 45° to the axis of each bottle. In this way, the point of contact on the exterior of each bottle moves along the bottle at a rate of 2 inches per minute in a direction from the shoulder to the base of each bottle. The test is carried out by subjecting each pair of bottles to repeated passes, the amount of force with which the upper bottle is applied against the lower bottle during each pass being greater than the amount of force used in the preceding pass. Prior to each pass, each of the two bottles is rotated to a new position so that during each pass a fresh surface of one bottle is contacted with a fresh surface of the other bottle. Thus the conditions to which one bottle is subjected during each pass are identical to the conditions to which the other bottle is subjected. After each pass, the bottles are examined for scratches, and the test is discontinued when a visible scratch appears. The scratch resistance value which is recorded as the result of the test is the amount of force in pounds which is applied during the pass which produces a visible scratch on at least one of the two bottles. If no scratch is found after the pass during which a load of 100 lbs. is applied, the test is discontinued and the scratch resistance is recorded as 100+.

In this scratch test, the coated bottles consistently showed a scratch resistance of greater than 100 lbs. The thickness of the coating was only about 0.1 to 1 mil.

The scratch resistance of more than 100 lbs. which is imparted by this coating is considered to be excellent, since the scratch resistance of the untreated glass bottles is only about 5 lbs. or less.

When the silane is omitted from the aqueous coating composition, the scratch resistance provided by the polyethylene alone is only about 20 lbs. When the polyethylene is omitted from the composition, the scratch resistance imparted by the silane alone is only about 10 lbs. Since the combination of the silane and the polyethylene used in the practice of the invention produces a coating having a scratch resistance greater than 100 lbs., it is evident that the combination of the two materials in the aqueous coating composition has a synergistic effect, providing a total scratch resistance which is much greater than the average of the scratch resistance produced by the two ingredients when used separately.

EXAMPLE 2

Bottles were coated with a composition which was prepared by a procedure which was the same as that described in Example 1, except that the partial hydrolysis step consisting of addition of hydrochloric acid, heating for 10 minutes and neutralizing with ammonium hydroxide, was omitted. The bottles coated in this manner, when tested as described in Example 1, showed a scratch resistance of about 80 lbs.

The coating produced in accordance with this example, like the coating produced in accordance with Example 1, was clear and lubricous.

EXAMPLE 3

A solution was prepared by adding 40 grams of a 50 percent alcohol solution of stearyltrimethoxysilane to 2 liters of water at 50°C. After the addition of the silane solution to the water, 1 gram of concentrated hydrochloric acid solution was added slowly with stirring. The solution of pH-2 was then heated to 50°C., and then neutralized with one gram of concentrated ammonium hydroxide, producing a pH of 5.5. The solution was then cooled to 30°C., and stirring was continued during the slow addition of 60 grams of polyethylene emulsion (AC 680). The actual content of the polyethylene in the emulsion was 15 grams.

The aqueous composition thus prepared was sprayed upon freshly formed glass bottles as the bottles reached the end of an annealing lehr, where their temperature was about 400°F. The rate of application was about 1 quart of the aqueous composition per 100 square feet of conveying belt. All of the bottles thus treated were found to have a clear, transparent, substantially colorless coating which was hard and lubricous.

These bottles showed a scratch resistance of 85 lbs. average when tested by the procedure described in Example 1. When this test procedure was repeated with the contacting surfaces of each pair of bottles submerged below the surface of a body of water, the test showed a scratch resistance in excess of 100 lbs.

Several of the bottles were then soaked in a 5 percent caustic soda solution at 150°F for 30 minutes. This treatment simulates the alkali wash which is used in commercial practice in order to clean refillable bottles before they are refilled. Such alkali treatment is known to be a severe treatment which damages most organic coatings. Dry bottles tested after the alkali treatment showed a scratch resistance of 50 lbs.

Another property of a coated surface of a glass container which tends to protect the surface against abrasion is lubricity. The lubricity was tested by a lubricity test performed upon the coated bottles. In the lubricity test, two bottles were clamped side by side in a horizontal position on a tiltable fixture, and a third bottle was laid on top of the two clamped bottles, so that the three bottles formed a pyramid, with each of the three bottles lying on its side. The fixture was then gradually tilted at a uniform rate about a horizontal axis lying in a plane perpendicular to the parallel axes of the three bottles. At the instant when the upper bottle began to slide along the two lower bottles, the tilting of the fixture was stopped and the angle of a tilt of the fixture relative to its initial horizontal position was measured. This angle was considered to be the angle of repose, which is a measure of the lubricity of the coated surface, a lower angle indicating a higher degree of lubricity.

The lubricity of the bottles coated in accordance with this example was found to be 17° dry and 14° wet. This lubricity is excellent, because the lubricity of the untreated bottles is about 35° to 40°, and most typically 40° to 45°.

While the invention has been described above to enable one skilled in the art to make and use the same, it will, of course, be apparent that modifications are possible which, pursuant to the patent statutes, are comprehended within the scope of the present invention.

I claim:

1. An article of manufacture comprising a glass surface having a scratch-resistant, lubricious, substantially transparent and colorless film which is bonded to the glass and comprises polyethylene and a silane having attached to the silicon atom, three hydrolyzable radicals of the class consisting of methoxy, ethoxy and chloro and one alkyl or acyl radical having from 12 to 18 carbon atoms.

2. An article of manufacture according to claim 1 wherein the film comprises polyethylene and stearyltrimethoxysilane.

* * * * *